(12) United States Patent
Asselin et al.

(10) Patent No.: US 11,500,156 B2
(45) Date of Patent: Nov. 15, 2022

(54) MANAGING ADHESIVE CURING FOR PHOTONIC SYSTEM ASSEMBLY

(71) Applicant: Ciena Corporation, Hanover, MD (US)

(72) Inventors: Daniel Asselin, Lévis (CA); Raphael Beaupré-Laflamme, Quebec (CA); Luc Belanger, Quebec (CA); Simon-Pierre Pelletier, Quebec (CA); Éric Giguère, Quebec (CA)

(73) Assignee: Ciena Corporation, Hanover, MD (US)

( * ) Notice: Subject to any disclaimer, the term of this patent is extended or adjusted under 35 U.S.C. 154(b) by 364 days.

(21) Appl. No.: 16/935,926

(22) Filed: Jul. 22, 2020

(65) Prior Publication Data
US 2022/0026637 A1   Jan. 27, 2022

(51) Int. Cl.
*G02B 6/13*   (2006.01)
(52) U.S. Cl.
CPC ..................................... *G02B 6/13* (2013.01)
(58) Field of Classification Search
CPC ....................................................... G02B 6/13
See application file for complete search history.

(56) References Cited

U.S. PATENT DOCUMENTS 9,823,419 B1   11/2017   Pelletier et al.

OTHER PUBLICATIONS

Boyer et al., "Novel, high throughput, fiber-to-chip assembly employing only off-the-shelf components", IEEE 67th Electronic Components and Technology Conference, 2017.

*Primary Examiner* — Joseph L Williams
(74) *Attorney, Agent, or Firm* — Young Basile Hanlon & MacFarlane, P.C.

(57) ABSTRACT

An apparatus for assembling a photonic system comprising a photonic integrated circuit (PIC) includes: a support structure configured to support the PIC; and a rigid structure surrounding a hollow passage that extends to an opening at a distal end of the rigid structure. The rigid structure includes an optically transmissive portion configured to transmit at least about 50% of a received beam of ultraviolet light, and configured such that at least a portion of the ultraviolet light transmitted through the rigid structure is incident upon an edge surface of the PIC at an angle of incidence that is less than about 60 degrees.

17 Claims, 10 Drawing Sheets

MANAGING ADHESIVE CURING FOR PHOTONIC SYSTEM ASSEMBLY

TECHNICAL FIELD

This disclosure relates to managing adhesive curing for a photonic system assembly.

BACKGROUND

In the manufacturing of various assemblies, small components are typically cemented in place with adhesives cured by ultraviolet (UV), visible, or infrared (IR) light. In some applications, like those requiring light coupling IN and OUT of photonic integrated circuits (PICs), the optical components are aligned with sub-micron accuracy, and this accuracy should be maintained through the whole product lifetime, which is usually many years. Examples of such components are lenses used in the focusing or collimation of free-space optical beams or the optical fibers intended to be butt-coupled to PICs.

In the adhesive curing process, the small components are typically held in place with high accuracy using specialized holding tools designed to pick up a component being aligned and fixed to another component, also called a "pick-up tool" (PUT). These tools are generally metallic in nature to hold the delicate components while the curing process is conducted, and often, the metallic tools obstruct the curing process. Consequently, in small assemblies, challenges arise in bringing the curing light to the adhesive. A relatively complex and uncontrolled light distribution results in the curing zone, which can be affected, for example, by absorption, shadows, uncontrolled reflections, and/or stray light. This leads to potential curing issues that can hinder an ability to cure adhesives in tightly packed spaces, and/or hinder an ability to cure adhesives uniformly while setting delicate PICs.

SUMMARY

In one aspect, in general, an apparatus for assembling a photonic system comprising a photonic integrated circuit (PIC) includes: a support structure configured to support the PIC; and a rigid structure surrounding a hollow passage that extends to an opening at a distal end of the rigid structure. The rigid structure includes an optically transmissive portion configured to transmit at least about 50% of a received beam of ultraviolet light, and configured such that at least a portion of the ultraviolet light transmitted through the rigid structure is incident upon an edge surface of the PIC at an angle of incidence that is less than about 60 degrees.

Aspects can include one or more of the following features.

The rigid structure is configured to reflect at least a portion of the ultraviolet light from a surface of the optically transmissive portion to guide the portion of the ultraviolet within the optically transmissive portion of the rigid structure and out of the distal end of the rigid structure.

The rigid structure is configured to guide at least a portion of a first received beam of the ultraviolet light from a proximal end of the rigid structure to the distal end of the rigid structure, where the guiding includes reflecting at least a portion of the ultraviolet light by total internal reflection from the surface of the optically transmissive portion.

The optically transmissive portion includes a lateral surface between the proximal end and the distal end of the rigid structure configured to transmit at least a portion of a second received beam of the ultraviolet light into the rigid structure.

The optically transmissive portion of the rigid structure includes a portion that has a uniform width along a cross section perpendicular to the hollow passage.

The rigid structure is configured to receive a first beam of the ultraviolet light into the rigid structure at a proximal end and guide the first beam of the ultraviolet light to the distal end of the rigid structure, and is configured to receive a second beam of the ultraviolet light through a lateral surface and emit at least a portion of the second beam from the distal end.

The opening at the distal end of the rigid structure is configured to contact a photonic component to be aligned to the PIC, and wherein the rigid structure is configured to direct the ultraviolet light from the distal end of the rigid structure to an adhesive between an edge surface of the photonic component and the edge surface of the PIC.

The apparatus further comprises a reflective structure contacting the photonic component at a first surface and configured to reflect at least a portion of the ultraviolet light to the edge surface of the PIC at an angle of incidence that is less than about 60 degrees, wherein the rigid structure contacts the photonic component at a second surface that is opposite of the first surface.

The reflective structure comprises a reflective material.

The reflective structure comprises a grating that includes a plurality of grating teeth.

The rigid structure is configured to receive at least a portion of the ultraviolet light into the rigid structure at an angle at which at least a portion of the ultraviolet light propagates through at least one surface between the optically transmissive portion of the rigid structure and the hollow passage and out of the distal end of the rigid structure.

The rigid structure includes a wedge portion, the wedge portion including a surface that is configured to refract at least a portion of the ultraviolet light at an angle of incidence of around 60 degrees or less.

The rigid structure includes a portion that is configured to converge at least a portion of the received beam of ultraviolet light so that the ultraviolet light that propagates out of the distal end is converging or diverging.

In another aspect, in general, a method for assembling a photonic system comprising a photonic integrated circuit (PIC) comprising a first waveguide and a photonic component comprising a second waveguide comprises: supporting the PIC on a support structure such that an edge surface of the PIC in proximity to an end of the first waveguide is accessible; providing an optical wave into the first waveguide or the second waveguide; monitoring a portion of the optical wave coupled into the first waveguide from the second waveguide or into the second waveguide from the first waveguide while aligning an edge surface of the photonic component to be flush with the edge surface of the PIC using a pick-up tool configured to move the photonic component; and providing at least a portion of at least one received beam of ultraviolet light to cure an adhesive between the edge surface of the photonic component and the edge surface of the PIC. At least about 50% of the received beam of ultraviolet light is transmitted through an optically transmissive portion of the pick-up tool, and at least a portion of the ultraviolet light transmitted through the pick-up tool is incident upon an edge surface of the PIC at an angle of incidence that is less than about 60 degrees.

Aspects can include one or more of the following features.

The received beam of ultraviolet light is transmitted through a portion of the pick-up tool configured as a light pipe, and wherein the received beam of ultraviolet light exits the light pipe to cure the adhesive.

The method further comprises changing a position of an ultraviolet light source providing the beam of ultraviolet light with respect to the edge surface of the PIC during the monitoring.

The received beam of ultraviolet light is transmitted through a lateral surface of the pick-up tool.

Aspects of the present implementations can have one or more of the following advantages.

Some of the advantages facilitate enhanced throughput of the curing light. For holding tools that are opaque to the curing light, most of the light does not reach the curing area through absorption, or reflection of the light at undesired locations. While such reduction in curing light throughput could be addressed by longer curing processes and/or to the use of more powerful light sources, such mitigation techniques can also bring additional challenges. Powerful light sources may have undesired side effects like heating for instance. Heating may not be desired in a curing process since the (metallic) holding tools often have a high coefficient of thermal expansion (CTE). This thermally induced expansion can add to the difficulty in maintaining good alignment during the whole curing process.

Some of the advantages mitigate curing light non-uniformities. If illumination conditions vary across the adhesive volume, such non-uniformities could lead to variations in the curing conditions, and therefore to improper/incomplete curing. The resulting stresses introduced could translate into uncontrolled, or difficult to predict, displacements of the components to be cured, preventing precise alignment. Mitigating such issues in the curing process reduces the need for extensive development efforts partly based on trials and errors. Also, non-uniformly cured elements may be more prone to misalignment afterwards leading to performance degradations over time. This may be due to ageing and changes in thermal and environmental conditions. More uniformly cured components reduce temperature stability requirements, thereby decreasing costs and power consumption while keeping the same performances.

The techniques disclosed herein can provide better throughput and/or uniformity of light because of the transparency and structure of tools described herein. With better throughput and uniformity, the time of the light curing process is reduced and non-uniform stresses are avoided in the cured areas due to consistent temperature and light exposure. Consequently, the adhesives are more fully cured, and partially, unevenly, and incompletely cured adhesives and assemblies that can cause poor qualities in final products can be avoided. In addition, overall lighting conditions are improved due to the reduction of shadows/absorption and due to the transparent holder bringing new degrees of freedom in the design of the illumination system.

The techniques disclosed herein can maintain accurate alignment over an extended period over the lifetime of the component (e.g., typically 15-20 years) from better overall light distribution on the adhesive between the delicate components. For example, less powerful light sources are sufficient to cure the adhesives, which is advantageous because high intensity light can introduce a heat load to the holding tool, potentially affecting positioning accuracy through thermal expansion. Metals CTEs are often much larger than glasses or plastics CTEs. Because less powerful light is sufficient, the processes and devices discussed herein can avoid a direct, unexpected heat load to the target area while providing a more uniform curing process through the rigid structure(s) of a pick-up tool. Because the processes and devices provide a more uniform curing process, the products formed by adhesive cure are less susceptible to ageing and changes in temperature and/or environmental conditions.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
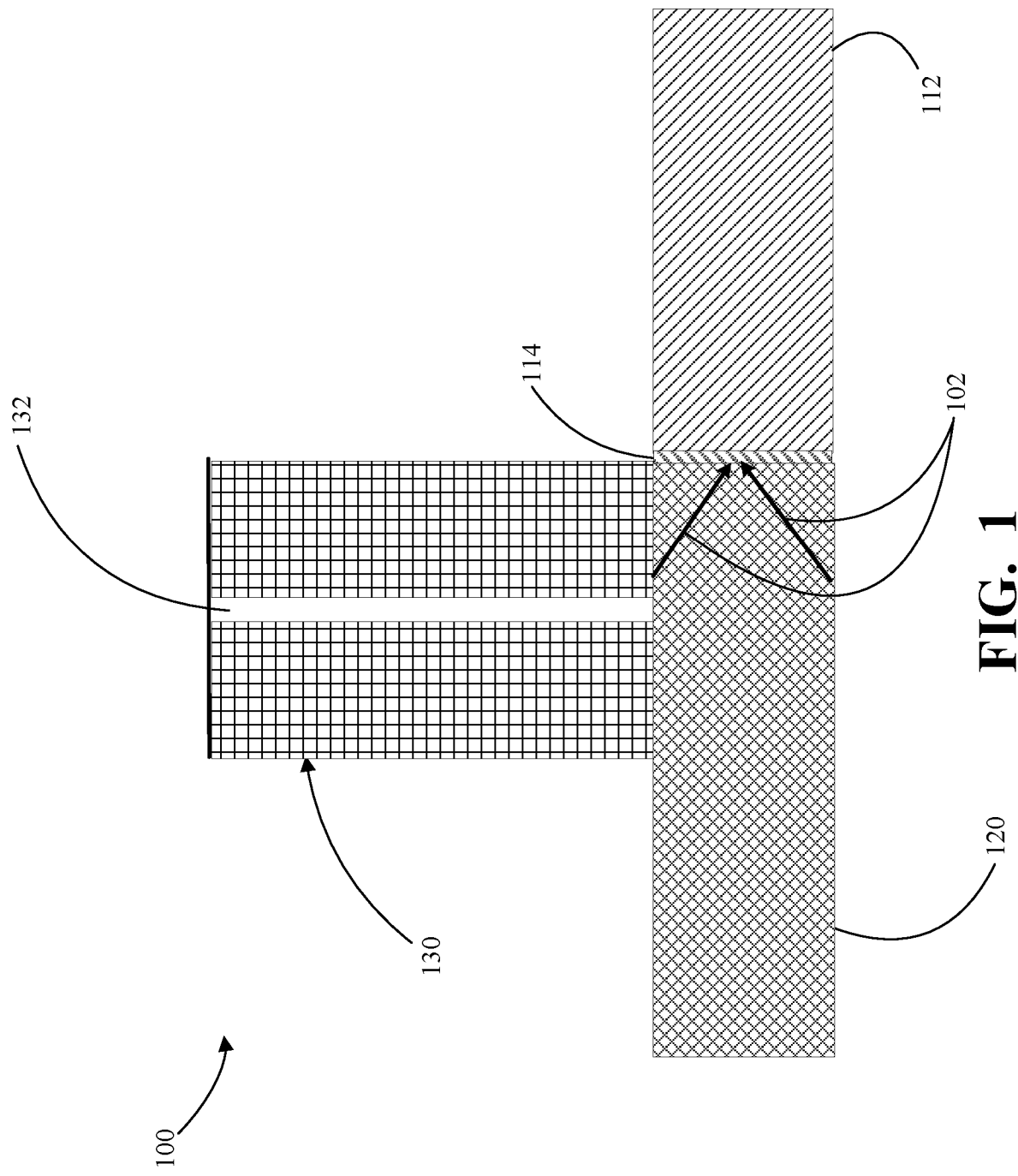
FIG. 1 is a schematic diagram of an example of an adhesive curing system using UV rays to cure an adhesive in a photonic system.

Generally, the adhesive curing systems described and illustrated herein can include tools and structures that form specialized stand-alone systems, or that function as a subsystem within a larger system for aligning and assembling components, for example. One part of such a system is a pick-up tool, which is configured to pick up a component that is being aligned as part of an assembly procedure. Such a pick-up tool can be constructed to include an optically transmissive portion that is either partially or fully transparent over an optical spectrum. An optical spectrum includes electromagnetic waves having a wavelength that falls within a particular range of optical wavelengths (e.g., between about 10 nm to about 1 mm, or some subrange thereof), also referred to as optical waves, light waves, or simply light. For example, in implementations in which UV light is used for curing an adhesive, the UV light can be transmitted through the optically transmissive portion of the pick-up tool and directed, by refraction, reflection, diffraction, or any combination thereof, to a target location, such as an adhesive between surfaces of components being attached to each other (e.g., a photonic component being attached to a PIC). For example, refraction can occur as the light passes into and out of the optically transmissive portion of the pick-up tool, reflection can occur as light hits a reflective coating or an interface providing total internal reflection, and diffraction can occur as light hits a reflective or transmission grating, as described in more detail below.

The example pick-up tools (also called "holding tools" or "holders") discussed herein may be fabricated using 3D printing (additive manufacturing) either directly for the manufacturing of custom pick-up tools, if the material is appropriate, or for the manufacturing of molds which could be used afterwards to produce the pick-up tools in some suitable materials. Holders or pick-up tools include structures that are more generally described herein as rigid structures that are able to maneuver one or more of the components during an alignment process before an adhesive curing process is carried out, and are also able to hold the components in place during the curing process. There is typically also a support structure that supports a stationary component to which the manipulated component has been aligned. However, the support structure may not need to include an optically transmissive portion. Regarding processes for manufacturing the rigid structure, without limitation, a laser, a computer numerically controlled (CNC) process, a diamond machining process, electric discharge machining (EDM) or any other type of processing could be used.

The rigid structure, which provides force during assembly when the adhesive is being cured, can be described as part of the illumination solution by bringing numerous new degrees of freedom to generate a relatively uniform light irradiance distribution in the curing zone. For example, the rigid structure could be configured to include a cylindrical or hemi-circular portion shaped to act as a lens to distribute light more efficiently. In other examples, certain surfaces or portion could be made partly or fully reflective to deflect UV light rays to specific targets. Further, the light source could be applied at a proximal position of a hollow rigid structure and/or a top surface of the rigid structure so that the rigid structure could be used as a light pipe to guide light.

Pertaining to curing light sources, the methods and devices discussed herein could utilize UV, visible, IR, or similar light for curing processes by accurately positioning and/or exposing of small components in an assembly. For example, the devices and processes used herein could be for setting delicate components like optics (e.g., microlenses, optical fibers, or components within devices such as microscopes, cameras, binoculars, telescopes), processors, transistors, diodes, integrated circuits, display technology, vacuum tubes, discharge devices, power sources, or any other similar small component parts. The light chosen could be selected for increased throughput, yield, thermal performance, environmental performance, or ageing performance. As described herein, the propagation direction, spatial profile, temporal profile, polarization, or intensity of light could be characterized by its constitutive ray(s), electric field(s), wavelength(s), frequency(ies), wavefront(s), pulse duration(s), beam(s), photon(s), or any combination thereof.

The implementations of rigid structures in the form of PUTs described herein are useful to replace opaque PUTs by utilizing materials that are transparent to the curing light source under use. Rigid structures forming a portion of a PUT can be relatively small (e.g., in some cases only few millimeters), and may include portions composed of similar or different materials or compositions. Rigid structures made of glass and plastic materials may be transparent replacements for metals, but any material transparent to the curing wavelength could be used. For example, the material could be inorganic, organic, or composition of inorganic and organic materials.

For example, in the rigid structure, an inorganic composition including one or more materials could be utilized. The inorganic material could be fused silica ($SiO_2$), $CaF_2$, sapphire, diamond, yttria, yttrium, aluminum garnet, silicon, ZnSe, borosilicate glass (e.g., Pyrex, N-Bk7), any low-melting temperature glasses suitable for injection molding (e.g., L-BAL35, L-LAH86), or any combination thereof. Low-melting temperature glasses could be a composition that includes one or more of boron oxide, barium oxide, calcium oxide, chlorine, potassium oxide, sodium oxide, antimony trioxide, silica, titanium oxide, silicon dioxide, boron trioxide, zinc oxide, zirconium oxide, titanium dioxide, tungsten oxide, sodium oxide, aluminum oxide, calcium oxide, chlorine, magnesium oxide, iron oxide, or any combination thereof.

In other examples, in the rigid structure, an organic composition including one or more materials could be utilized. The organic material could be polycarbonate, polyethylene, polymethylmethacrylate, polyethylene terephthalate, polylactic acid, polyvinyl butyral, or any combination thereof.

Optical adhesives that are transparent to specific wavelengths can be used to generate both the mechanical and optical bridges between the optical fiber and the PIC. These optical adhesives may also have a matching index of refraction to prevent back reflection or disturbance in the light path. There are other adhesives that have characteristics that provide a mechanical link between a component and a substrate where there may be a need for a very precise positioning, and some adhesives can also contain a filler (e.g., SiO2 particles) when there may be a need for a specific coefficient of thermal expansion (CTE) to match the supporting materials and minimize stresses at interfaces during thermal excursions. Epoxy family of adhesives is an example of adhesives that can be tailored to meet optical and/or mechanical requirements for adhesive curing in an opto-electronic assembly procedure.

The adhesive curing process may include use of a reflective material that functions to more strongly reflect light towards adhesives and PICs as described herein. Generally, the reflective material is adhered or affixed to a bottom surface of a component, as described in more detail below. The reflective material may be configured to reflect a portion of incident curing light so that the reflected light is directed to a surface of a PIC, an adhesive, or both at a more direct angle of incidence. The reflective material may be one or more of the following materials: Gold, Aluminum, Silver, Steel, Nickel, for example. Reflective materials can be applied in any of a variety of arrangements, such as bulk, plated, or polished, and can include highly or partially reflective dielectric coatings, and/or dichroic filters, for example.

The materials or compositions utilized in the rigid structure have a wavelength transparency that is sufficient to allow UV, IR, visible light, or a combination thereof to be transmitted to the PIC, the adhesive, or both. The optical spectrum over which an optically transmissive portion of the rigid structure has a relatively high transmittance (e.g., greater than 50% in some cases, or greater than 80% in some cases) can include wavelengths within a UV portion of the spectrum (e.g., wavelengths between about 10 nm to about 400 nm).

The materials or compositions used in the rigid structure may be chemically inert to avoid contamination with the curing processes described herein. The materials or composition may be a desired refractive index that assists with providing appropriate light guiding properties to guide the curing light to the curable adhesives. In some implementations, the refractive index is selected to provide total internal reflection for at least some of the rays that are guided within the rigid structure. The exact refractive indices of two materials in contact or on either side of an interface (e.g., the interface could be a glass-air interface, or a glass-glass interface) dictate the value of the critical angle above which total internal reflection occurs. Without limitation, typical refractive indices are 1.00 (air), 1.33 (water), 1.44 (fused silica), 1.46 (pyrex), 1.50 (N-BK7), 1.62 (H-ZF1), 1.75 (Sapphire), 2.45 (ZnSe), 3.48 (Silicon), 4.10 (Germanium). Moreover, the reflective/transmissive properties of an interface between two adjacent materials can be tailored by an appropriate combination. In addition, the material or compositions used in the rigid structure may have a low coefficient of thermal expansion (e.g., less than 20 ppm/K) so that the rigid structure avoids changing in volume and may avoid shifting the alignment of the photonic components while the curing light is curing the adhesive.

The rigid structure may be used for optical fibers and other delicate components like lenses that are actively aligned through some feedback mechanism. This leads to the great alignment accuracy and, as a result, high optical performances. In the active alignment described herein, the components may be positioned in full 3D space (i.e., XYZ position and tilt). Positioning in full 3D space while monitoring allows for optimization of the components by adjusting connections among photonic components before a full adhesive cure is conducted.

In active alignment, each component is individually aligned and, in some cases, two or more components are simultaneously and individually aligned. Although this leads to the high optical performances, the very small dimensions typical of PICs exacerbate the need for tiny rigid structures of intricate shapes used as one or more pick-up tool(s). For example, in some implementations, two pick-up tools are brought in close proximity to each other (e.g., spacing of about 1 millimeter or less), and in very close proximity to the opaque PIC itself. As a result, there is little space left to bring UV, visible, or IR light sources to the volume of adhesive to be cured under the pick-up tools and to bring light to the curing zone under the pick-up tools. Other considerations for the curing process that are relevant include but are not limited to lighting conditions, which strongly influence the quality of the curing process in terms of accuracy and stability over changing environmental conditions (e.g., temperature and/or humidity), and over time (i.e., ageing).

The various examples and implementations of the curing process using optically transparent rigid structures, in the form of pick-up tools, are discussed below. Alternative examples may include additional structures and/or different arrangement of structures. For example, for simplicity, in these examples, a single pick-up tool is shown, but in alternative examples, two or more pick-up tools may be used. Even though each of the FIGS. are discussed separately, each implementation or example may utilize elements of another to achieve optimal cures of adhesives between PICs and photonic components (i.e., fibers). Each FIG. is intended to be a teaching example of the implementations that may utilize any other teaching described herein.

FIG. 1 is a schematic diagram of an example of an adhesive curing system 100 using UV light as curing light. The spatial distribution and propagation direction of the UV light will be illustrated and described in terms of its constituent light rays, which will be referred to herein as UV light rays, or simply "UV rays." In this example, UV rays 102 represent selected rays that reach an adhesive 114 over an extended period of time while the adhesive 114 is being cured, after which the cured adhesive 114 will bond a PIC 112 to a photonic component 120. A surface of the photonic component 120 is held by a rigid structure 130 (e.g., a pick-up tool) that enables another surface of the photonic component 120 to be aligned to a surface of the PIC 112 (e.g., an edge surface for a photonic component 120 being edge coupled to the PIC 112). By including a hollow passage 132 in the rigid structure 130, an associated pump system can be used to establish at least a partial vacuum within the hollow passage 132 when sealed at one end against the photonic component 120, such that the rigid structure 130 maneuvers holds the photonic component 120 against the adhesive 114 until a UV cure is complete. The hollow passage 132 is open at a proximal end (e.g., an end closest to a UV source) and a distal end (e.g., an end farthest from a UV source), and the hollow passage 132 contacts the photonic component 120 at the distal end (e.g., optionally, in some implementations, using a gasket or other structure to enhance the vacuum seal). In proximity to the proximal end of the hollow passage 132, a UV source (not shown) may provide UV light transmitted through the hollow passage 132 and a top surface of the rigid structure 130. In some implementations, a UV source (not shown) may provide UV light transmitted through a lateral surface of the rigid structure 130. In some implementations, multiple UV sources can be used to provide UV light through both a top surface and a lateral surface of the rigid structure 130.

Generally, most of the photonic component 120 is formed from materials that are substantially transparent to the UV light. For example, the photonic component 120 can comprise a borosilicate ferule surrounding an optical fiber or a borosilicate structure supporting an array of optical fibers. The photonic component 120 can also be modified to facilitate adhesive curing, as in some of the examples described below. The rigid structure 130 may also be fully or partially transparent to enable the UV light to more easily reach the adhesive. For example, the rigid structure 130 can be configured to include an optically transmissive portion that is configured to direct UV light such that at least some of its constituent UV rays are more directly incident on the adhesive. In some implementations, the rigid structure 130, the photonic component 120, or both may be configured to refract and/or reflect UV rays 102 to the PIC 112 at an angle of incidence that is within a predetermined range. For example, in some implementations, the angle of incidence may be about 70 degrees or less, about 65 degrees or less, or about 60 degrees or less. The UV rays 102 may be transmitted through any surface of the photonic component 120, the rigid structure 130, or both so that the UV rays 102 are directed to the adhesive 114 between surfaces of the photonic component 120 and the PIC 112 at the appropriate angle of incidence. With the appropriate composition and structure of the rigid structure 130, a significant fraction of the UV light emitted from the UV source (e.g., at least about 50%) is guided through the rigid structure 130 to contact the adhesive 114. After the UV curing of the adhesive is maintained for an appropriate duration of time, there may be additional curing steps (e.g., a heat curing step), which may be performed while the assembled photonic system is still secured in the adhesive curing system 100 in some cases, or after the assembled photonic system is removed from the adhesive curing system 100 in other cases. The refractive index of the photonic component 120 and the rigid structure 130 may be the same or substantially similar so that any UV rays are minimally or not refracted when transmitted between the photonic component 120 and the rigid structure 130 or any similar component, such as an optical block used in some of the examples described below.

Regarding shape and form, the rigid structure 130 may have substantially continuous and uniform lateral sides stretching between the proximal end to the distal end. In some implementations, the rigid structure 130 may be formed as a continuous cylinder, triangle, square, rectangle, pentagon, hexagon, heptagon, octagon, or any shape that can be used to direct UV rays 102. In the following examples, rigid structures will be described in the form of various configurations of a pick-up tool. However, the portion of the pick-up tool illustrated in the referenced FIGS. 2-7, 8A, and 8B, may just be a portion (e.g., a tip) of a larger structure that forms the entire pick-up tool.

Figure 2:
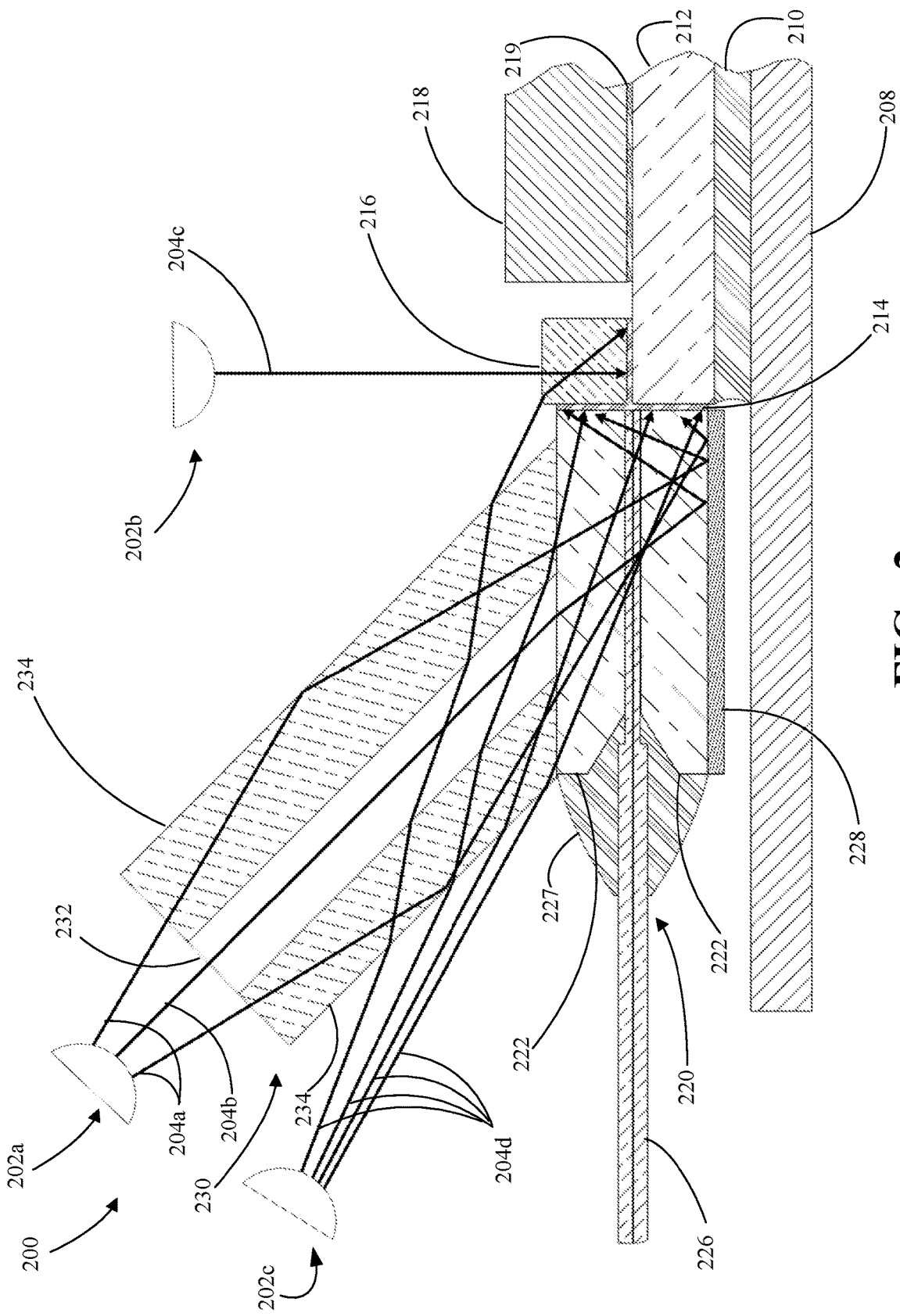
FIG. 2 is a schematic diagram of an example of an adhesive curing system using a first UV source, a second UV source, and third UV source.

FIG. 2 is a schematic diagram of an example of an adhesive curing system 200 using a first UV source 202a, a second UV source 202b, and third UV source 202c. Three UV sources 202a, 202b, 202c are shown in this example, but in other examples, more or fewer UV sources can be used in the adhesive curing system 200. The adhesive curing system 200 includes a package 208 that supports a PIC 212 to which an optical fiber coupling component 220 is being attached using an adhesive. The PIC 212 is secured to the package 208 using a fastening member 210 (e.g., an adhesive or other form of binding material and/or structure). The portion of the package 208 shown in FIG. 2 is, for example, a lid of a larger structure. A portion of the package can then be temporarily supported by a support structure (not shown) that secures the PIC against movement as the optical fiber coupling component 220 is being aligned. For example, the package can be releasably attached by inserting leads of the package into small cavities, or pressure bars can be used to apply pressure on the leads. In some implementations, the leads are mechanically secured to input/output contacts (e.g., for active alignment). In addition to the optical fiber coupling component 220, there may be other photonic elements that have already been attached (or will be attached) to the PIC 212 before, during, or after the adhesive curing process described in this example. For example, an optical block 216 can be attached before the curing process to extend a surface to which the optical fiber coupling component 220 will be attached, and a substrate 218 can be attached using additional adhesive 219 that may be cured during the same curing process, or in a separate curing process (e.g., if no precision alignment is needed, then there may not be a need for use of a pick-up tool).

The optical fiber coupling component 220 includes a borosilicate ferule 222 that surrounds an optical fiber 226 (or simply "fiber 226"), and has a compound 227 (e.g., a glue or adhesive) securing the fiber 226 to the ferule 222. In this cross-sectional view of the ferule 222, the top and bottom portions shown above and below the fiber 226 are part of the same cylindrical shaped structure. Between the surface formed by the optical block 216 and the PIC 212 and the surface of the ferule 222, a layer of adhesive 214 connects the ferule 220 and its embedded optical fiber 226 to the PIC 212, and the adhesive 214 is uncured before the transmission of the UV rays 204a, 204b, 204c, and 204d. While the adhesive is uncured, the pick-up tool 230 is able to align the core of the optical fiber 226 to a waveguide in a top layer of the PIC 212. The optical block 216 may be composed of a similar material or composition as the pick-up tool 230 or any rigid structure discussed herein. A reflective material 228 is provided on a bottom surface of the ferule 222. The reflective material 228 may be adhered or fastened in any way sufficient to keep the reflective material 228 in physical connection with the ferule 222. Beneath the optical fiber coupling component 220 and the reflective material 228, the package 208 is spaced a distance from the reflective material 228.

With vacuum forces, the pick-up tool 230 secures the optical fiber coupling component 220 at a distal end of the pick-up tool 230 at about a 45 degree angle. Specifically, the hollow passage 232 of the pick-up tool 230 pulls on the top surface of the ferule 222 by a suction or vacuum force. The suction or vacuum forces may come from a machine or device (not shown) that is fixed or positioned on the proximal end of the pick-up tool 230. The UV source 202a and/or the machine or device that provides suction forces may be affixed to the pick-up tool 230. Regarding the connection between the pick-up tool 230 and the optical fiber coupling component 220, the vacuum forces can be releasable or disconnect-able through stopping or turning off the suction or vacuum forces.

Positioned at a proximal end of the pick-up tool 230, the first UV source 202a emits UV rays 204a, 204b through the optical fiber coupling component 220 and the pick-up tool 230. Specifically, the UV rays 204a are transmitted through a transmissive portion 234 of the pick-up tool 230 surrounding the hollow passage 232. The transmissive portion 234 can include material that does not absorb a significant amount of UV light. For example, after any partial or total internal reflection at an air interface with a surface of the transmissive portion 234, a significant portion of the UV light received into the transmissive portion 234 will be transmitted to a surface at which the UV light exits without the UV light being absorbed. So, a material can be selected that has an absorbance small enough to provide a transmittance of at least 50% or more, for example. UV rays from the UV source 202a, including UV rays 204a, are received into a proximal end of the transmissive portion 234 and are emitted out of a distal end of the transmissive portion 234. While traveling through the transmissive portion 234, the UV rays 204a may reflect one or more times on the inner and outer surfaces of the transmissive portion 234 (e.g., via total internal reflection) before the UV rays 204a are received through a top surface of the ferule 222.

Other UV rays from the UV source 202a, including the UV ray 204b, are transmitted directly through the hollow passage 232 at the proximal end of the pick-up tool 230 and out the distal end of the pick-up tool 230 to the top surface of the ferule 222. For both of the UV rays 204a, 204b, the ferule 222 directs the UV rays 204a, 204b towards the reflective material 228 or directly to the adhesive 214. Where the UV rays 204a, 204b are directed to the reflective material 228, the UV rays 204a, 204b are reflected to the adhesive 214 between the optical fiber coupling component 220 and the PIC 212. In either case, at least some of the UV rays from the UV source 202a are incident at a surface of the adhesive 214 (which is approximately parallel to surfaces of the optical fiber coupling component 220 and the PIC 212) at a relatively direct angle of incidence (e.g., about 60 degrees or less) that would be more difficult or impossible to achieve if the pick-up tool 230 was completely opaque and the UV rays had to be directed around the pick-up tool 230.

The UV source 202b, which may have been used to previously cure adhesive for attaching the optical block 216 and/or the substrate 218, can also be used during the curing process for the adhesive 214. Positioned above the optical block 216, the second UV source 202b transmits a UV ray 204c through the optical block 216. Even though one UV ray 204c is shown, multiple UV rays are emitted from the UV source 202b, similarly to the UV sources 202a and 202c. When the UV ray 204c is transmitted to and through the optical block 216, the UV ray 204c contacts the adhesive 219 at the bottom of the optical block 216 at a substantially direct angle of incidence (i.e., about a 0 degree angle of incidence). But, the angle of incidence upon the adhesive 214 may only be at grazing incidence (e.g., greater than about 80 degrees). So, the UV source 202b may provide less UV energy to be absorbed by the adhesive 214 during the curing process than the UV sources 202a and 202c.

Positioned proximate to a side of the transmissive portion 234, the third UV source 202c emits UV rays 204d through the pick-up tool 230, the optical fiber coupling component 220, and to the adhesive 214. Specifically, the UV rays 204d are transmitted from the UV source 202c at varying angles and the UV rays 204d are refracted through an outer surface of the transmissive portion 234 of the pick-up tool 230 at multiple angles and at multiple locations. The UV rays 204d will enter into ferule 222 at different locations and at different angles after refraction at the boundary between the outside environment (e.g., air) and the transmissive portion 234, at the boundary between the transmissive portion 234 and the hollow passage 232 (e.g., containing low pressure air or other gas), and/or at the boundary between either the transmissive portion 234 or the hollow passage 232 and the ferule 222. So, generally, some of the UV rays 204d are transmitted through the ferule 222 directly to the adhesive 214, and/or some of the UV rays 204d are transmitted through the ferule 222 and reflected by the reflective material 228 to the adhesive 214. In either case, at least some of the UV rays from the UV source 202c are incident at a surface of the adhesive 214 at a relatively direct angle of incidence (e.g., about 60 degrees or less) that would be more difficult to achieve if the pick-up tool 230 were completely opaque and the UV rays had to be directed around the pick-up tool 230. If the UV rays 204d exit at a boundary of an outside environment and the transmissive portion 234, the UV rays 204d may refract again at an angle that is directed towards the optical block 216 and to the adhesive 214 below. When enough energy from the UV sources 202a, 202b, 202c have been absorbed by the adhesive 214, the adhesive 214 is cured, and the optical fiber coupling component 220 and the PIC 212 are adhered together.

Figure 3:
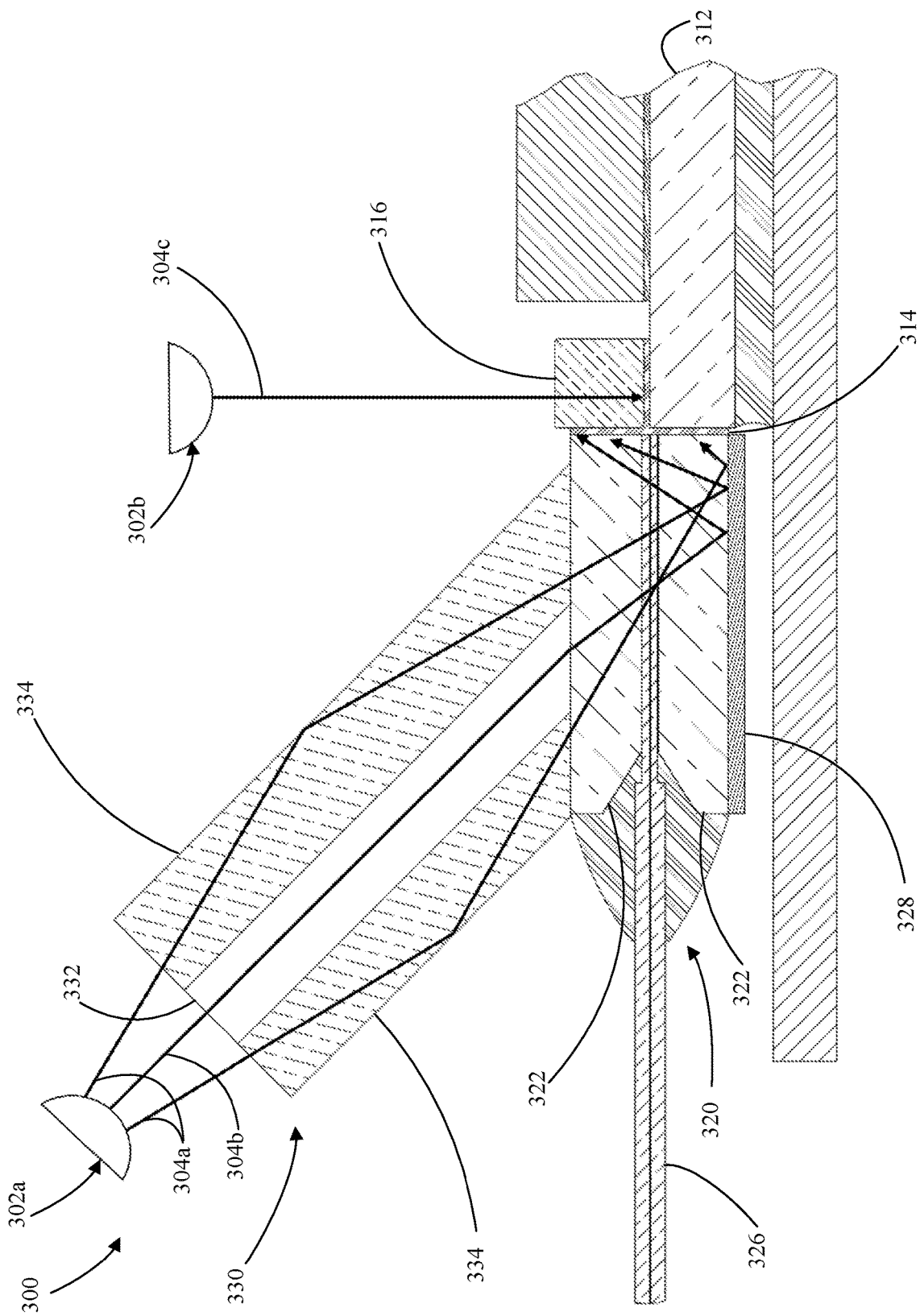
FIG. 3 is a schematic diagram of an example of an adhesive curing system using a first UV source and a second UV source.

FIG. 3 is a schematic diagram of an example of an adhesive curing system 300 using a first UV source 302a and a second UV source 302b. The pick-up tool 330 is contacting a top surface of a ferule 322 of an optical fiber coupling component 320 at about a 45 degree angle, which is held by releasable vacuum forces at a hollow passage 332, similarly to the vacuum forces of the pick-up tool 230 of FIG. 2. However, the pick-up tool 330 and the optical fiber coupling component 320 may contact at other angles so that UV rays 304a, 304b are directed to an edge of a PIC 312 at a relatively direct angle of incidence. The PIC 312 and an optical block 316 form a surface to which a surface of the ferule 322 is attached using an adhesive 314 that is uncured until UV rays 304a, 304b are absorbed by the adhesive 314 during a curing process. The PIC includes a waveguide that is aligned to an optical fiber 326 in a similar fashion as the optical fiber 226 of FIG. 2. Regarding structure, form, or properties, the pick-up tool 330 and the optical fiber coupling component 320 may be similar to the pick-up tools 130, 230, and the photonic component 120 and the optical fiber coupling component 220 of FIGS. 1 and 2. Above the optical block 316, the second UV source 302b emits UV rays 304c to the optical block 316, similarly to how the UV source 202b emits UV rays 204c in FIG. 2.

In this implementation, the first UV source 302a emits UV rays 304a, 304b and the pick-up tool 330 acts as a light pipe without any additional UV rays being transmitted through the pick-up tool 330, such as UV rays 204d in FIG. 2. The UV source 302a emits the UV rays 304a through a proximal end of a transmissive portion 334 of the pick-up tool 330. In the transmissive portion 334, the UV rays 304a may bounce (i.e., reflect) on the lateral walls of the pick-up tool 330 one or more times before being received by a top surface of the ferule 322. After receiving the UV rays 304a, the ferule 322 enables the UV rays 304a to propagate to reflective material 328 coated on its bottom surface, and the reflective material 328 reflects the UV rays 304a to the adhesive 314. In the hollow passage 332, UV rays 304b are transmitted from the proximal end to the distal end of the pick-up tool 330. At the distal end, the UV rays 304b refract at a boundary of the air in the hollow passage 332 and the top surface of the ferule 322. After refraction of the UV rays 304b, the UV rays 304b propagate to the bottom surface 322 and contact the reflective material 328, and the reflective material 328 directs the UV rays 304b to the adhesive 314. Some of the rays 304a and/or 304b may also directly contact adhesive 314 without reflection from reflective material 328.

Figure 4:
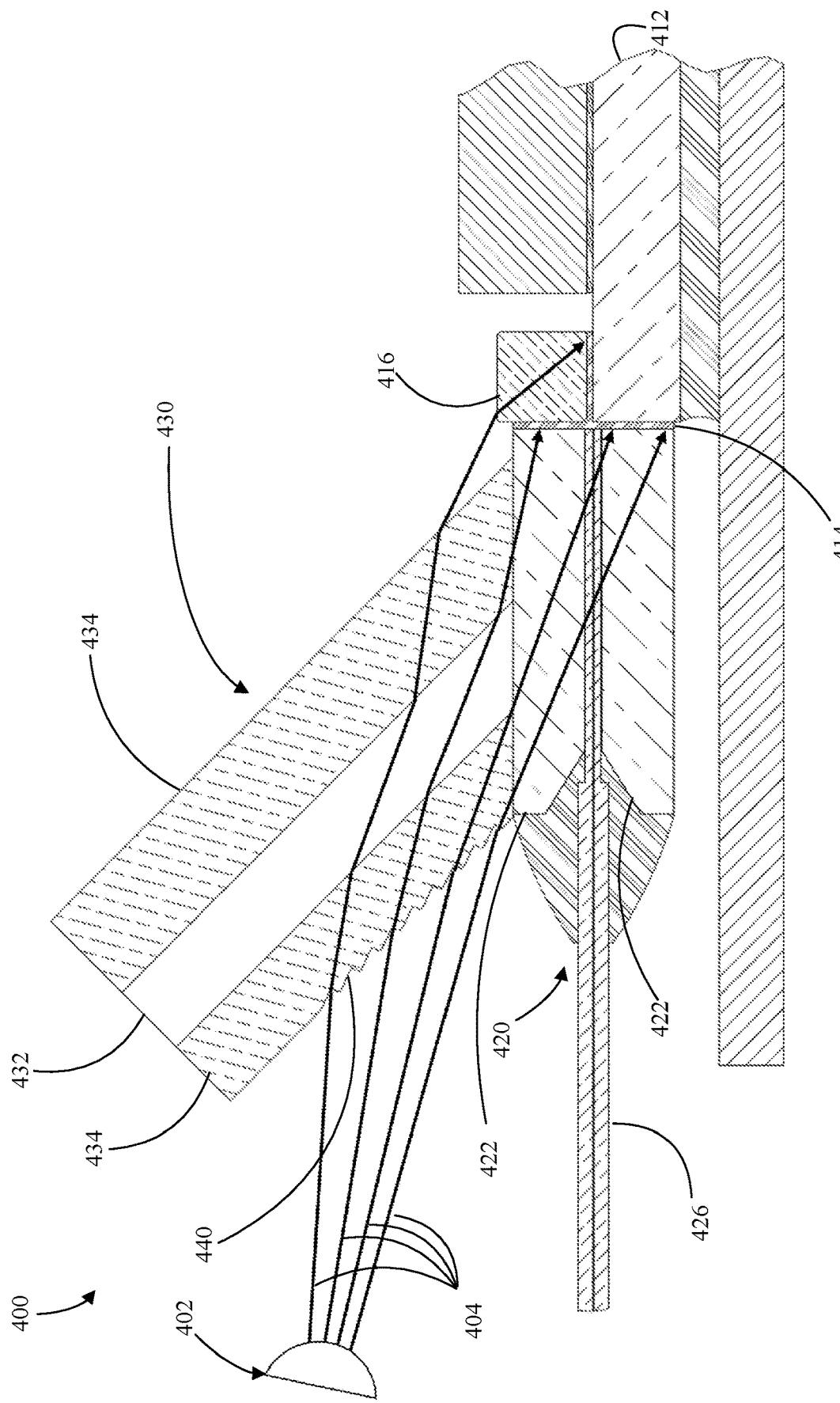
FIG. 4 is a schematic diagram of an example of an adhesive curing system using a UV source and a pick-up tool that includes teeth.

FIG. 4 is a schematic diagram of an example of an adhesive curing system 400 using a UV source 402 and a pick-up tool 430 that includes a lateral surface with a grating and/or Fresnel lens 440 (denoted generally as grating in the following) configured for receiving UV rays. The pick-up tool 430 is contacting a top surface of a ferule 422 of an optical fiber coupling component 420 at about a 45 degree angle, which is held by releasable vacuum forces at a hollow passage 432, similarly to the vacuum forces of the pick-up tool 230 of FIG. 2. However, the pick-up tool 430 and the optical fiber coupling component 420 may contact at other angles so that UV rays 404 are directed to an edge of a PIC 412 at a relatively direct angle of incidence. The PIC 412 and an optical block 416 form a surface to which a surface of the ferule 422 is attached using an adhesive 414 that is uncured until UV rays 404 are absorbed by the adhesive 414 during a curing process. The PIC 412 includes a waveguide that is aligned to an optical fiber 426 in a similar fashion as the optical fiber 226 of FIG. 2. Regarding structure, form, or properties, the pick-up tool 430 and the optical fiber coupling component 420 may be similar to the pick-up tools 130, 230, and the photonic component 120 and the optical fiber coupling component 220 of FIGS. 1 and 2.

Positioned laterally relative to a surface of the transmissive portion 434, the UV source 402 emits UV rays 404 into the transmissive portion 434. Specifically, the UV rays 404 are incident upon the transmissive portion 434 at one or more teeth of the grating 440 that are configured to refract/diffract light at an angle that directs the light to the adhesive 414. The grating 440 may be configured similarly to a Fresnel lens, for example. For directing and refracting the UV rays 404, the teeth of the grating 440 are angled relative to a continuous lateral wall of the transmissive portion 434. In an alternative way, if the teeth of the grating 440 are closely spaced enough, the UV rays 404 can be directed through diffraction in one of many directions simultaneously. Regarding the transmission, reflection, diffraction, and refraction of the UV rays 404, the UV source 402 may transmit UV rays 404 through the transmissive portion 434, the hollow passage 432, optical fiber coupling component 420, and the optical block 416 similarly to how UV rays 204d are transmitted, directed, refracted, and reflected from the UV source 202c in FIG. 2. Ultimately, the grating 440 of the transmissive portion 434 refracts and directs the UV rays 404 through the hollow passage 432, the top surface of the ferule 422, or any combination thereof, so that the UV rays 404 are incident upon the adhesive 414 at a relatively direct angle of incidence.

Figure 5:
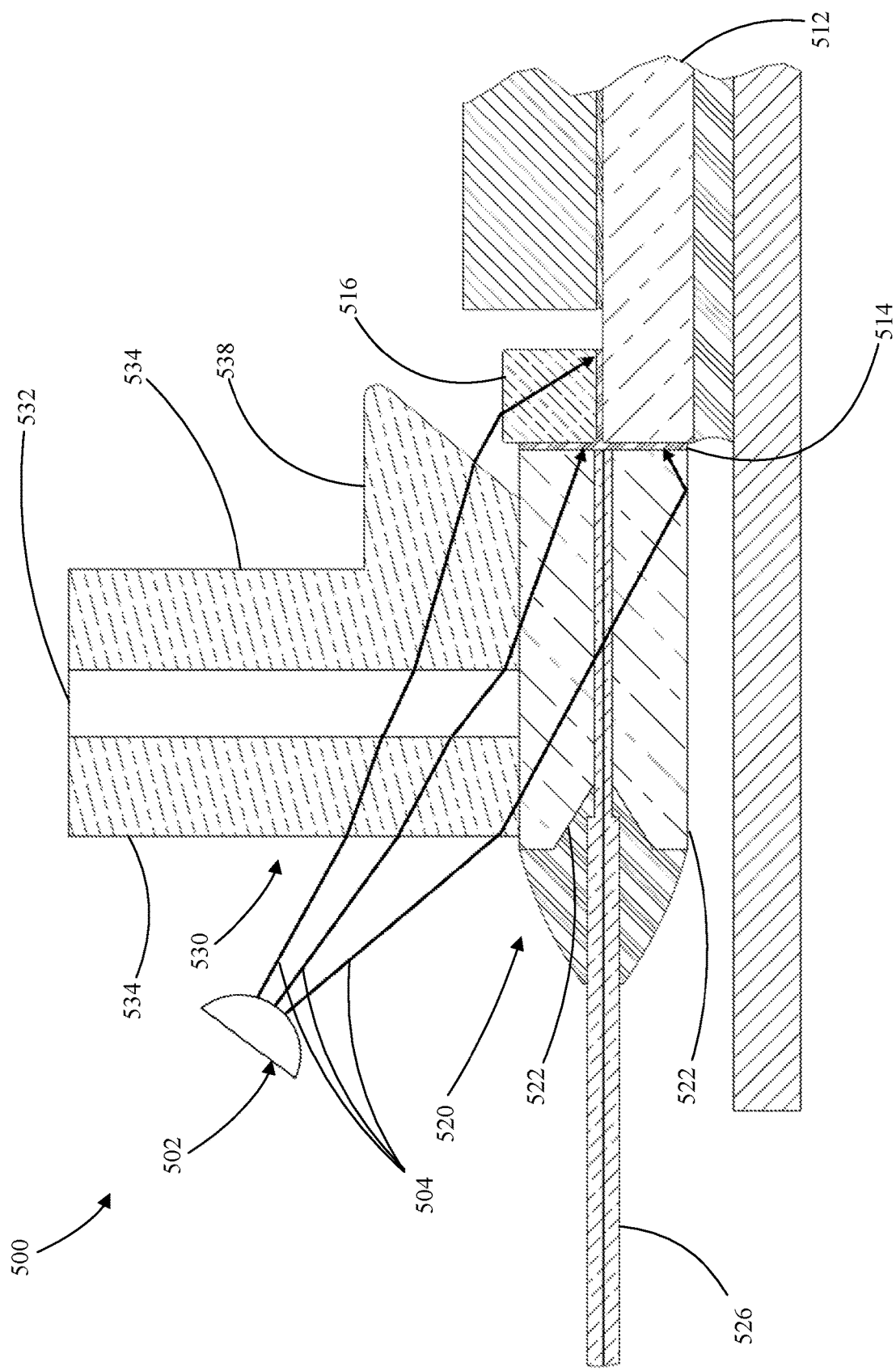
FIG. 5 is a schematic diagram of an example of an adhesive curing system using a UV source and a pick-up tool that includes a wedge.

FIG. 5 is a schematic diagram of an example of an adhesive curing system 500 using a UV source 502 and a pick-up tool 530 that includes a wedge 538 upon exit of UV rays from a pick-up tool 530. The pick-up tool 530 is contacting a top surface of a ferule 522 optical fiber coupling component 520, which is held by releasable vacuum forces at a hollow passage 532, similarly to the vacuum forces of the pick-up tool 230 of FIG. 2. At the point of contact, the top surface of the ferule 522 and the transmissive portion 534 of the pick-up tool 530 contact at a substantially right angle (i.e., about 90 degrees). The wedge 538 includes an outer surface that meets the top surface of the ferule 522 at about a 45 degree angle, and a top surface that is extended outward from a lateral wall of the pick-up tool 530. The optical block 516 is located proximate to and below a surface of the wedge 538. The wedge 538 and the ferule 522 may contact at other angles to direct the UV rays 504 to an edge of a PIC 512 at a relatively direct angle of incidence. The PIC 512 and an optical block 516 form a surface to which a surface of the ferule 522 is attached using an adhesive 514 that is uncured until UV rays 504 are absorbed by the adhesive 514 during a curing process. The PIC 512 includes a waveguide that is aligned to an optical fiber 526 in a similar fashion as the optical fiber 226 of FIG. 2.

Positioned proximate to a lateral surface of the transmissive portion 534, the UV source 502 emits UV rays 504 through a smooth surface of the transmissive portion 534 of the pick-up tool 530 in this example. The UV rays 504 are transmitted from the UV source 502 at multiple angles so that the UV rays 504 are directed to the adhesive 514, at different positions and, in some implementations, at different angles of incidence. For example, the UV source 502 transmits some UV rays 504 through the transmissive portion 534, and the UV rays 504 refract at a boundary of the transmissive portion 534 and the outside environment. Then, transmissive portion 534 directs some of the UV rays 504 to the top surface of the ferule 522 so that the UV rays 504 are at least partially reflected from the bottom surface 522 of the ferule 522 (e.g., by total internal reflection) and are directed to the adhesive 514, at a relatively direct angle of incidence.

In this example, some of the UV rays 504 propagate through the transmissive portion 534, and cross the boundary between the hollow passage 532 and the transmissive portion 534, as described in relation to the hollow passage 232 and the UV rays 204d of FIG. 2. As the UV rays 504 cross the boundary between the hollow passage 532 and the second surface 536, the UV rays 504 refract and exit into the ferule 522, or propagate across the wedge 538 and exit into the optical block 516.

Figure 6:
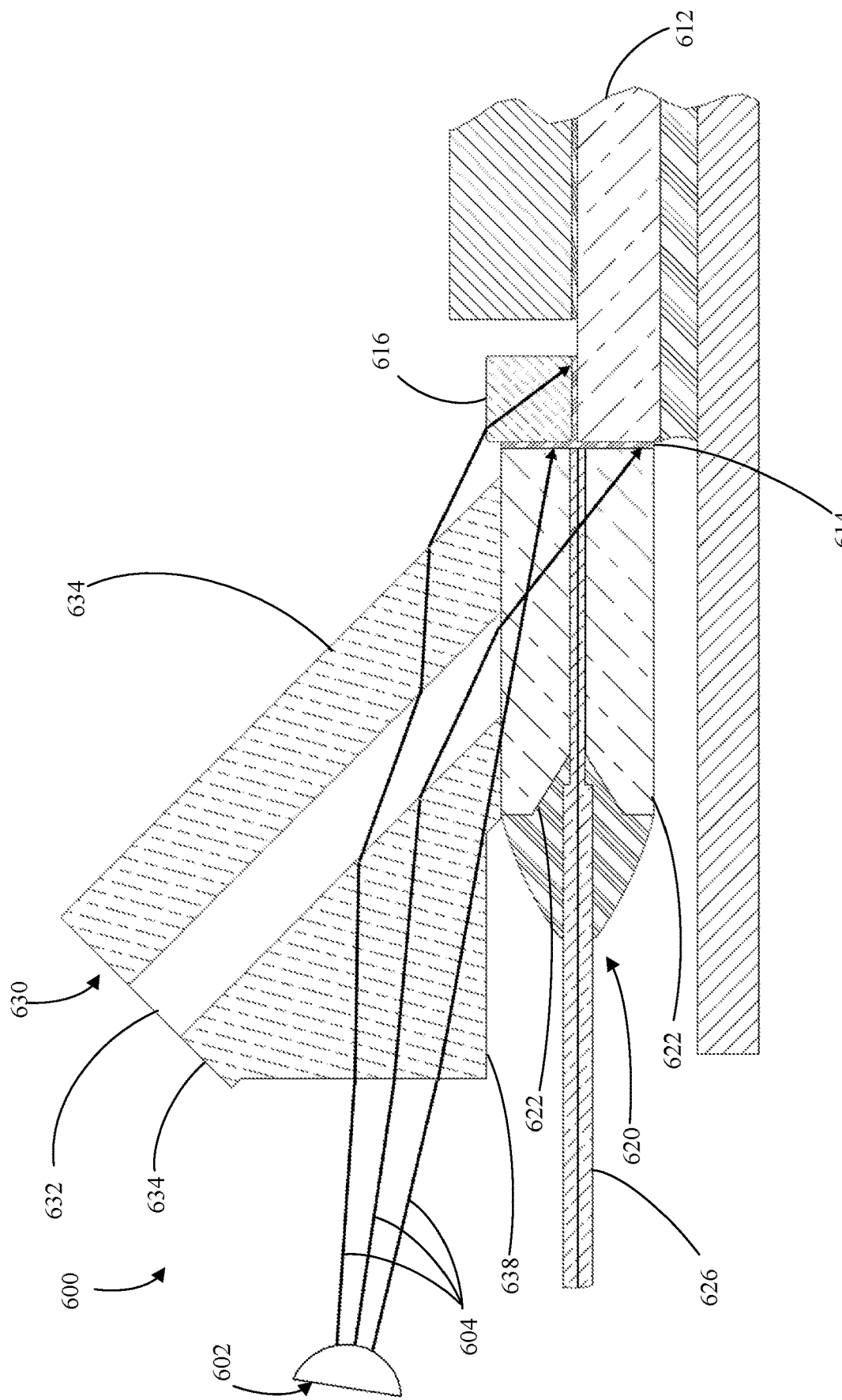
FIG. 6 is a schematic diagram of an example of an adhesive curing system using a UV source and a pick-up tool that includes a wedge.

FIG. 6 is a schematic diagram of an example of an adhesive curing system 600 using a UV source 602 and a pick-up tool 630 that includes a wedge 638 upon entrance of UV rays into a pick-up tool 630. The pick-up tool 630 is contacting a top surface of a ferule 622 at about a 45 degree angle, which is held by releasable vacuum forces at the hollow passage 632, similarly to the vacuum forces of the pick-up tool 230 of FIG. 2. The wedge 638 is positioned on the transmissive portion 634 and is spaced a distance apart from the ferule 622 so that the wedge 638 is free of contact with the ferule 622. A PIC 612 and an optical block 616 form a surface to which the ferule 622 is attached using an adhesive 614 that is uncured until UV rays 604 are absorbed by the adhesive 614 during a curing process. The PIC 612 includes a waveguide that is aligned to an optical fiber 626 in a similar fashion as the fiber 226 of FIG. 2.

Positioned proximate to the transmissive portion 634 and the wedge 638, the UV source 602 transmits UV rays 604 through the wedge 638 so that the UV rays 604 are directed to an edge of the PIC 612 at a relatively direct angle of incidence. In this implementation, the UV rays 604 refract at the boundary of the wedge 638 and the outside environment. After refracting and depending on the angle of emission from the UV source 602, the UV rays 604 propagate across the wedge 638 to the top surface of the ferule 622 either directly, or after refraction at the interface with the hollow passage 632.

Figure 7:
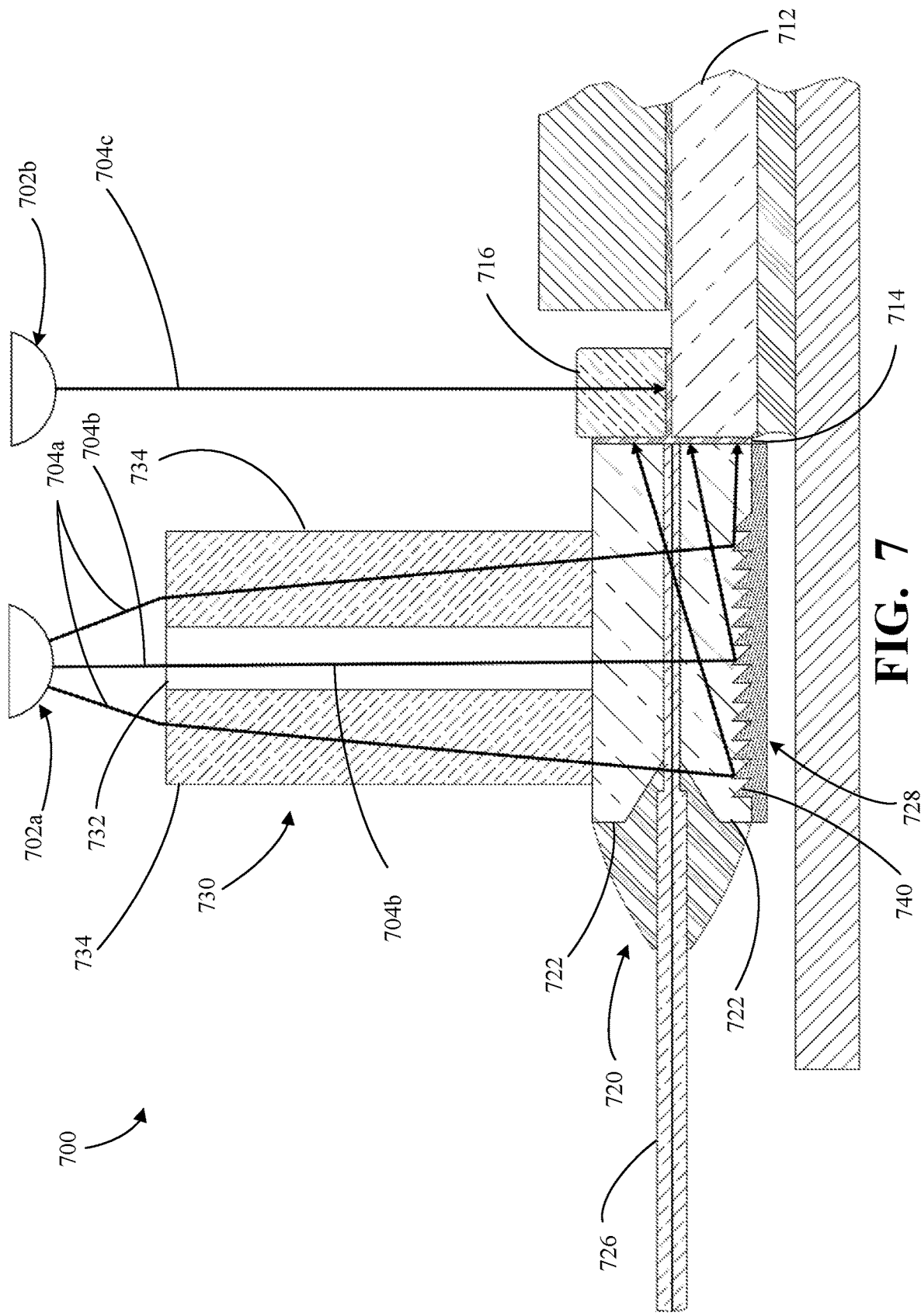
FIG. 7 is a schematic diagram of an example of an adhesive curing system using a first UV source, a second UV source, and a reflective material that includes teeth.

FIG. 7 is a schematic diagram of an example of an adhesive curing system 700 using a first UV source 702a, a second UV source 702b, and a reflective structure 728, which in this example comprises a grating that includes teeth 740. A pick-up tool 730 is contacting a top surface of a ferule 722 at a substantially right angle (i.e., about 90 degrees), which is held by releasable vacuum forces at a hollow passage 732, similarly to the vacuum forces of the pick-up tool 230 of FIG. 2. The reflective structure 728 is integrated with or adhered to a bottom surface of the ferule 722 and reflects UV rays 704a, 704b towards an edge of a PIC 712 and an adhesive 714 at a relatively direct angle of incidence. The PIC 712 and an optical block 716 form a surface to which a surface of the ferule 722 is attached using the adhesive 714 that is uncured until UV rays 704a, 704b and 704c are absorbed by the adhesive 714 during a curing process. The PIC 712 includes a waveguide that is aligned to an optical fiber 726 in a similar fashion as the fiber 226 of FIG. 2. Above the optical block 716, a second UV source 702b emits UV rays 704c to the optical block 716, similarly to how the UV source 202b emits UV rays 204c in FIG. 2.

Positioned at a proximal end of the pick-up tool 730, the first UV source 702a emits the UV rays 704a, 704b through the pick-up tool 730. In the hollow passage 732 of the pick-up tool 730, some of the UV rays 704b are transmitted through the proximal end of the pick-up tool 730, through the hollow passage 732, and to the distal end of the pick-up tool 730. Next, the UV rays 704b are transmitted through the top surface of the ferule 722 and towards the teeth 740 of the reflective material 728. The teeth 740 are configured to reflect the UV rays 704b towards an edge of the PIC 712 at a relatively direct angle of incidence. For the other UV rays 704a, the first UV source 702a emits the UV rays 704a through the transmissive portion 734 of the pick-up tool 730. Inside the transmissive portion 734, the UV rays propagate through the pick-up tool 730 and towards the top surface of the ferule 722. In some implementations, the UV rays 704a may bounce (i.e., partially or fully reflect) on the lateral walls of the transmissive portion 734 before contacting the top surface of the ferule 722. The teeth 740 are configured to reflect the UV rays 704a towards an edge of the PIC 712 at a relatively direct angle of incidence.

Figure 8A:
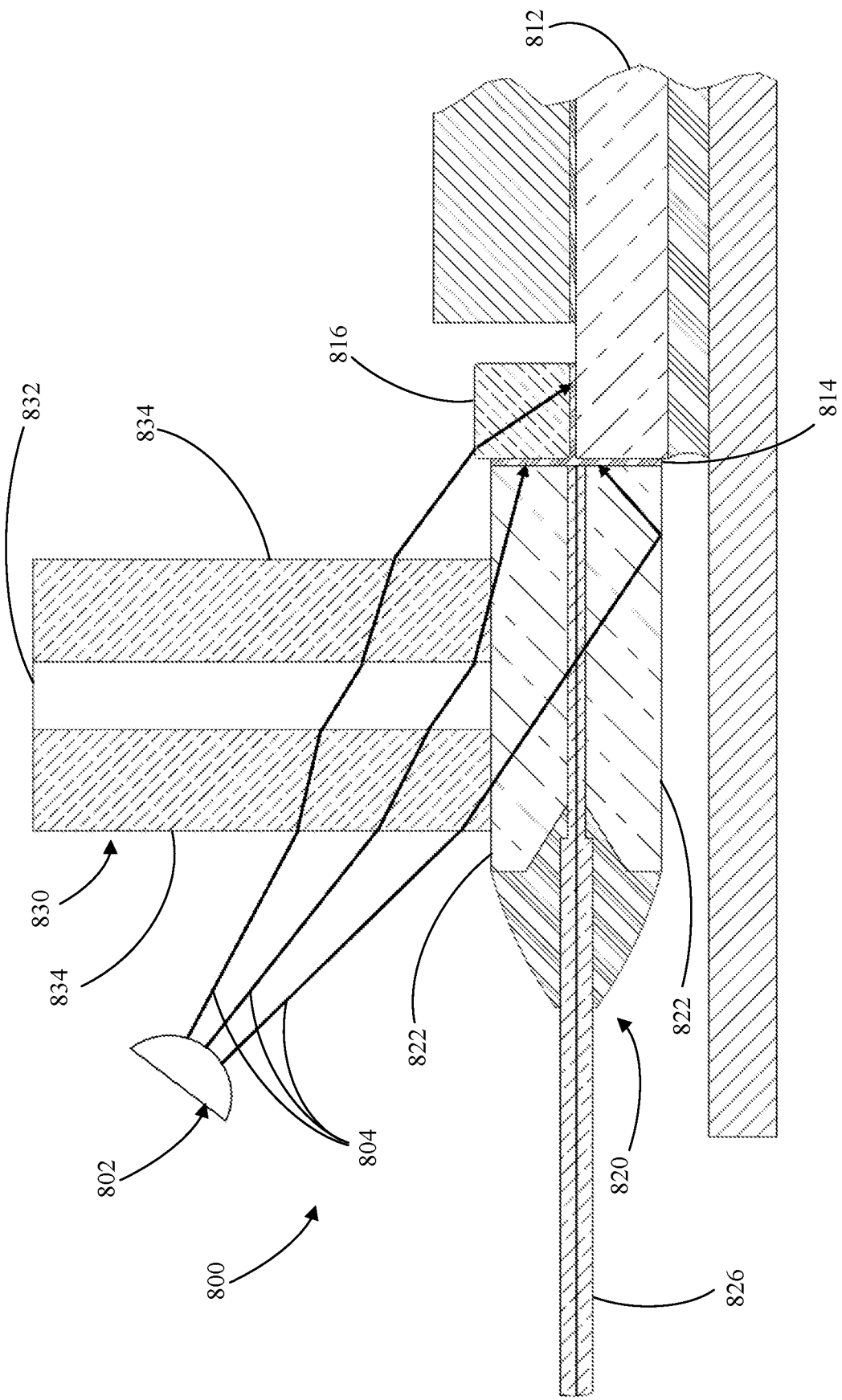
FIG. 8A is a schematic diagram of an example of an adhesive curing system using a UV source and a pick-up tool that includes a portion formed as a hemi-circle.
Figure 8B:
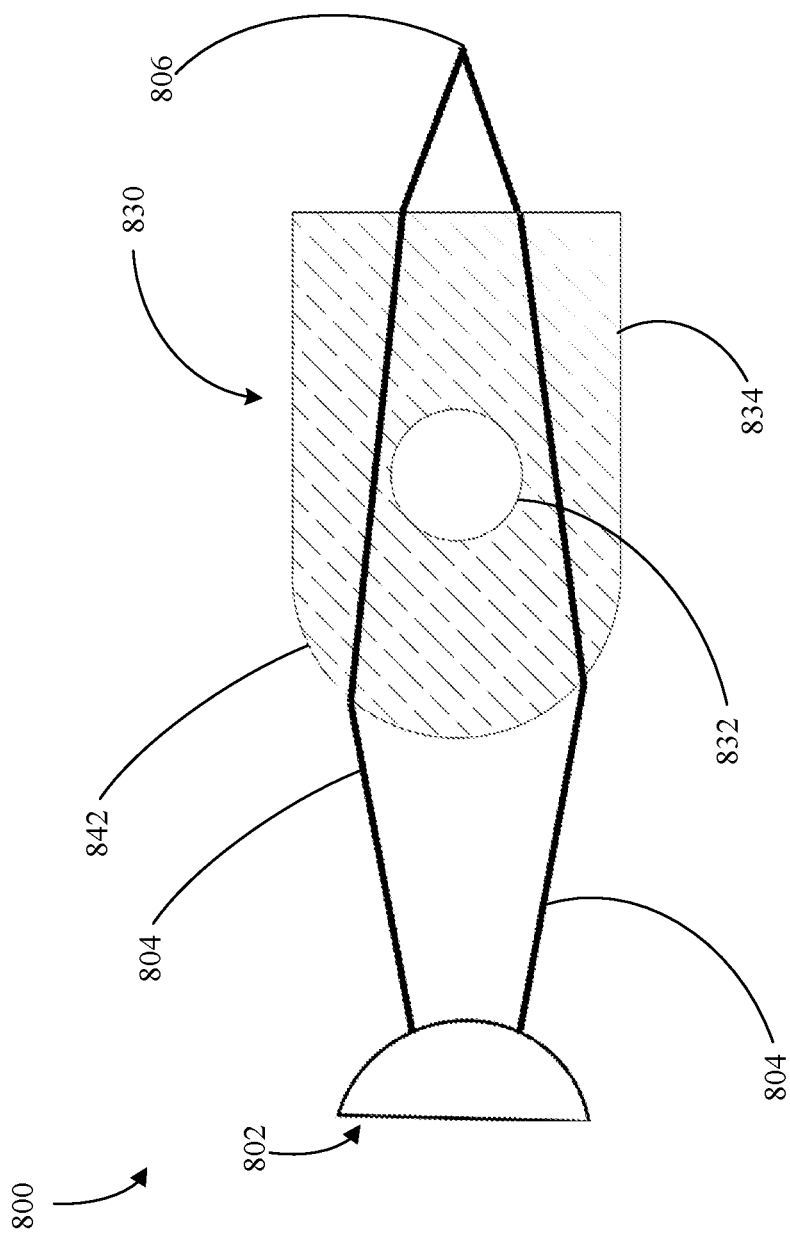
FIG. 8B is a schematic diagram showing another view of the pick-up tool of FIG. 8A that includes a portion formed as a hemi-circle.

FIG. 8A is a schematic diagram of an example of an adhesive curing system 800 using a UV source 802 and a pick-up tool 830 that includes a portion that is formed as a hemi-circle (as shown in FIG. 8B). The pick-up tool 830 is contacting a top surface of a ferule 822 at a substantially right angle (i.e., about 90 degrees), which is held by releasable vacuum forces at a hollow passage 832, similarly to the vacuum forces of the pick-up tool 230 of FIG. 2. A transmissive portion 834 of the pick-up tool 830 includes a portion that is formed as the hemi-circle to provide some convergence of at least some of the rays 804, as described in more detail below. A PIC 812 and an optical block 816 form a surface to which a surface of the ferule 822 is attached using an adhesive 814 that is uncured until UV rays 804 are absorbed by the adhesive 814 in a curing process. The PIC 812 includes a waveguide that is aligned to an optical fiber 826 in a similar fashion as the optical fiber 226 of FIG. 2.

Positioned proximate to a lateral surface of the transmissive portion 834, the UV source 802 emits UV rays 804 through a hemi-circular surface of the transmissive portion 834 of the pick-up tool 830. The UV source 802 emits the UV rays 804 at multiple angles so that the UV rays 804 are ultimately directed to the adhesive 814 at different positions and, in some implementations, at a different angle of incidence. In this implementation, at least some of the UV rays 804 are converged to focus the beam provided by the UV source 802, as described below with reference to FIG. 8B, before contacting the adhesive 814.

FIG. 8B is schematic diagram showing another view of the example of the pick-up tool 830 of FIG. 8A that includes a portion 842 of the transmissive portion 834 that is formed as a hemi-circle 842. The UV source 802 emits UV rays 804 through the hemi-circle 842 of the transmissive portion 834. The UV rays 804 refract at the boundary of the hemi-circle 842 and the outside environment and are transmitted out of the transmissive portion 834 converging in the horizontal plane as shown to a narrow focused region 806. Consequently, the converging UV rays 806 are directed to the adhesive 814 with concentrated power, which may enhance the curing of the adhesive 814. Although concentrated UV rays 806 are shown exiting a lateral side of the transmissive portion 834 in FIG. 8B, the UV rays 804 may include additional converting UV rays (shown in FIG. 8A) after exiting a distal end of the transmissive portion 834, depending on the original angle of the UV rays from the UV source 802.

Figure 9:
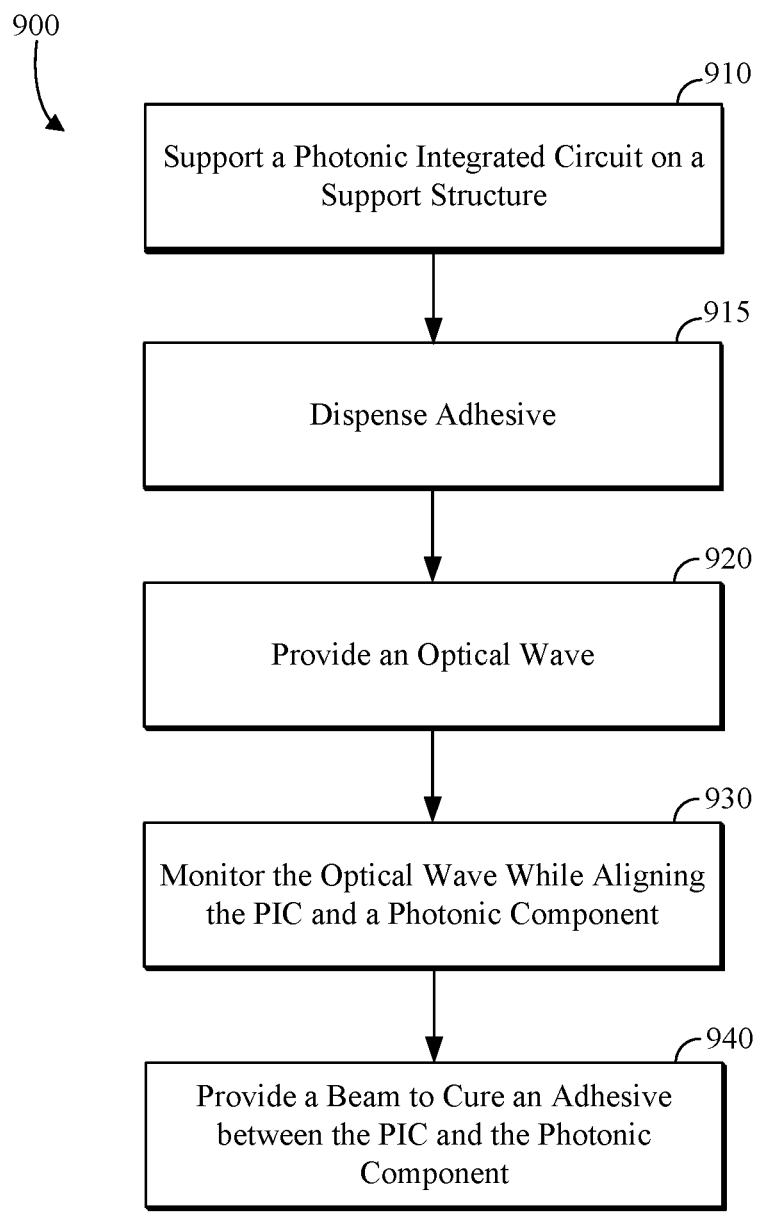
FIG. 9 is a flowchart of an example method 900 for assembling a photonic system.

FIG. 9 shows steps of an example method 900 for assembling a photonic system. The method 900 utilizes a PIC that includes a first waveguide and a photonic component (e.g., an optical fiber coupler) that includes a second waveguide. In a one step 910, the package of the PIC is supported on a support structure such that an edge surface of the PIC is in proximity to an end of the first waveguide and is accessible to other components. In another step, 915, the adhesive is dispensed on surfaces that will be aligned. In another step 920, an optical wave is provided into the first waveguide or the second waveguide. The optical wave may be utilized to test the accuracy of alignment between the first waveguide and the second waveguide to determine if the photonic system has sufficient connection between the components. In another step 930, the optical wave is coupled and monitored either into the first waveguide from the second waveguide or into the second waveguide from the first waveguide while aligning an edge surface of the photonic component to be flush with the edge surface of the PIC using a pick-up tool configured to move the photonic component. In another step 940, a portion of at least one received beam of ultraviolet light is provided to cure an adhesive between the edge surface of the photonic component and the edge surface of the PIC. In other example methods for assembling a photonic system, additional steps can be added, and/or these steps can be performed in a different order or replaced with other steps. In some implementations, an optically transmissive portion of the pick-up tool consists essentially of a material that has low enough UV absorption such that at least about 50% of the received beam of ultraviolet light is transmitted through the optically transmissive portion of the pick-up tool. After transmission of the beam, at least a portion of the ultraviolet light transmitted through the pick-up tool is incident upon an edge surface of the PIC at an angle of incidence that is less than about 60 degrees. As described herein, the angle of incidence may vary depending on how ultraviolet light is transmitted, reflected, refracted, diffracted, or directed by one or more of the structures or components, for example, in FIGS. 1-8B.

In some implementations of the method, the received beam of ultraviolet light is transmitted through a proximal end of the pick-up tool so that the pick-up tool is configured to be a light pipe. In addition, the received beam of ultraviolet light exits the pick-up tool at a distal end of the pick-up tool to cure the adhesive, similarly to FIGS. 2-3 and 7. In other implementations, at least one received beam of ultraviolet light is received through a lateral surface of the pick-up tool in a position that is opposite of the PIC, similarly to FIGS. 2, 4-6, and 8A-8B.

In some implementations, a further step may be added that includes optimizing the position of an ultraviolet light source around the photonic component, the PIC, or both so that the adhesive cure exposure from the ultraviolet light cure is improved. A further step may be added of determining whether the adhesive has fully cured between the components. Where the adhesive has not fully cured, the ultraviolet light source may shift position to improve the percentage of ultraviolet light that reaches the PIC, the adhesive, or both. For example, the ultraviolet light source may rotate around the PIC, the photonic component or both, so that the UV light is transmitted at a different angle, and thus, the adhesive cures more thoroughly and efficiently. In other example methods, steps can be changed, such as by reordering steps, replacing steps, and/or supplementing with other steps.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus for assembling a photonic system comprising a photonic integrated circuit (PIC), the apparatus comprising:
   a support structure configured to support the PIC; and
   a rigid structure surrounding a hollow passage that extends to an opening at a distal end of the rigid structure, the rigid structure
      including an optically transmissive portion configured to transmit at least about 50% of a received beam of ultraviolet light, and
      configured such that at least a portion of the ultraviolet light transmitted through the rigid structure is incident upon an edge surface of the PIC at an angle of incidence that is less than about 60 degrees.

2. The apparatus of claim 1, wherein the rigid structure is configured to reflect at least a portion of the ultraviolet light from a surface of the optically transmissive portion to guide the portion of the ultraviolet within the optically transmissive portion of the rigid structure and out of the distal end of the rigid structure.

3. The apparatus of claim 2, wherein the rigid structure is configured to guide at least a portion of a first received beam of the ultraviolet light from a proximal end of the rigid structure to the distal end of the rigid structure, where the guiding includes reflecting at least a portion of the ultraviolet light by total internal reflection from the surface of the optically transmissive portion.

4. The apparatus of claim 3, wherein the optically transmissive portion includes a lateral surface between the proximal end and the distal end of the rigid structure configured to transmit at least a portion of a second received beam of the ultraviolet light into the rigid structure.

5. The apparatus of claim 2, wherein the optically transmissive portion of the rigid structure includes a portion that has a uniform width along a cross section perpendicular to the hollow passage.

6. The apparatus of claim 2, wherein the rigid structure is configured to receive a first beam of the ultraviolet light into the rigid structure at a proximal end and guide the first beam of the ultraviolet light to the distal end of the rigid structure, and is configured to receive a second beam of the ultraviolet light through a lateral surface and emit at least a portion of the second beam from the distal end.

7. The apparatus of claim 1, wherein the opening at the distal end of the rigid structure is configured to contact a photonic component to be aligned to the PIC, and wherein the rigid structure is configured to direct the ultraviolet light from the distal end of the rigid structure to an adhesive between an edge surface of the photonic component and the edge surface of the PIC.

8. The apparatus of claim 7, further comprising:
a reflective structure contacting the photonic component at a first surface and configured to reflect at least a portion of the ultraviolet light to the edge surface of the PIC at an angle of incidence that is less than about 60 degrees,
wherein the rigid structure contacts the photonic component at a second surface that is opposite of the first surface.

9. The apparatus of claim 8, wherein the reflective structure comprises a reflective material.

10. The apparatus of claim 8, wherein the reflective structure comprises a grating that includes a plurality of grating teeth.

11. The apparatus of claim 1, wherein the rigid structure is configured to receive at least a portion of the ultraviolet light into the rigid structure at an angle at which at least a portion of the ultraviolet light propagates through at least one surface between the optically transmissive portion of the rigid structure and the hollow passage and out of the distal end of the rigid structure.

12. The apparatus of claim 11, wherein the rigid structure includes a wedge portion, the wedge portion including a surface that is configured to refract at least a portion of the ultraviolet light at an angle of incidence of around 60 degrees or less.

13. The apparatus of claim 11, wherein the rigid structure includes a portion that is configured to converge at least a portion of the received beam of ultraviolet light so that the ultraviolet light that propagates out of the distal end is converging or diverging.

14. A method for assembling a photonic system comprising a photonic integrated circuit (PIC) comprising a first waveguide and a photonic component comprising a second waveguide, the method comprising:
supporting the PIC on a support structure such that an edge surface of the PIC in proximity to an end of the first waveguide is accessible;
providing an optical wave into the first waveguide or the second waveguide;
monitoring a portion of the optical wave coupled into the first waveguide from the second waveguide or into the second waveguide from the first waveguide while aligning an edge surface of the photonic component to be flush with the edge surface of the PIC using a pick-up tool configured to move the photonic component; and
providing at least a portion of at least one received beam of ultraviolet light to cure an adhesive between the edge surface of the photonic component and the edge surface of the PIC, wherein
at least about 50% of the received beam of ultraviolet light is transmitted through an optically transmissive portion of the pick-up tool, and
at least a portion of the ultraviolet light transmitted through the pick-up tool is incident upon an edge surface of the PIC at an angle of incidence that is less than about 60 degrees.

15. The method of claim 14, wherein the received beam of ultraviolet light is transmitted through a portion of the pick-up tool configured as a light pipe, and wherein the received beam of ultraviolet light exits the light pipe to cure the adhesive.

16. The method of claim 14, further comprising:
changing a position of an ultraviolet light source providing the beam of ultraviolet light with respect to the edge surface of the PIC during the monitoring.

17. The method of claim 14, wherein the received beam of ultraviolet light is transmitted through a lateral surface of the pick-up tool.

* * * * *